Oct. 25, 1966
P. V. MOSHER ETAL
3,280,808
ENGINE CRANKCASE VENTILATING SYSTEM
Filed Jan. 4, 1965
3 Sheets-Sheet 1
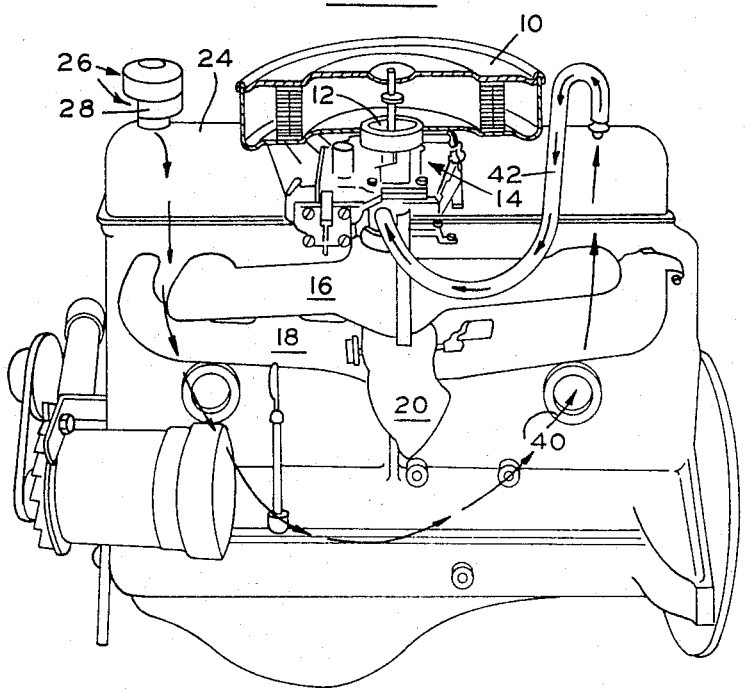
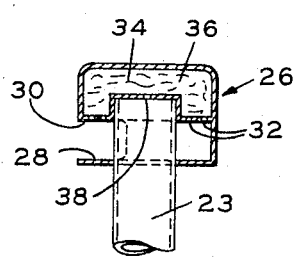
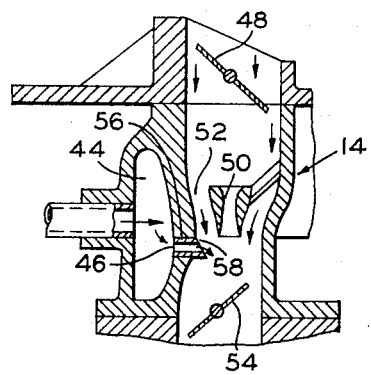
ARTHUR M. SMITH
PHILIP V. MOSHER
*INVENTORS*
BY *John R. Faulkner*
*Robert E. McCollum*
ATTORNEYS

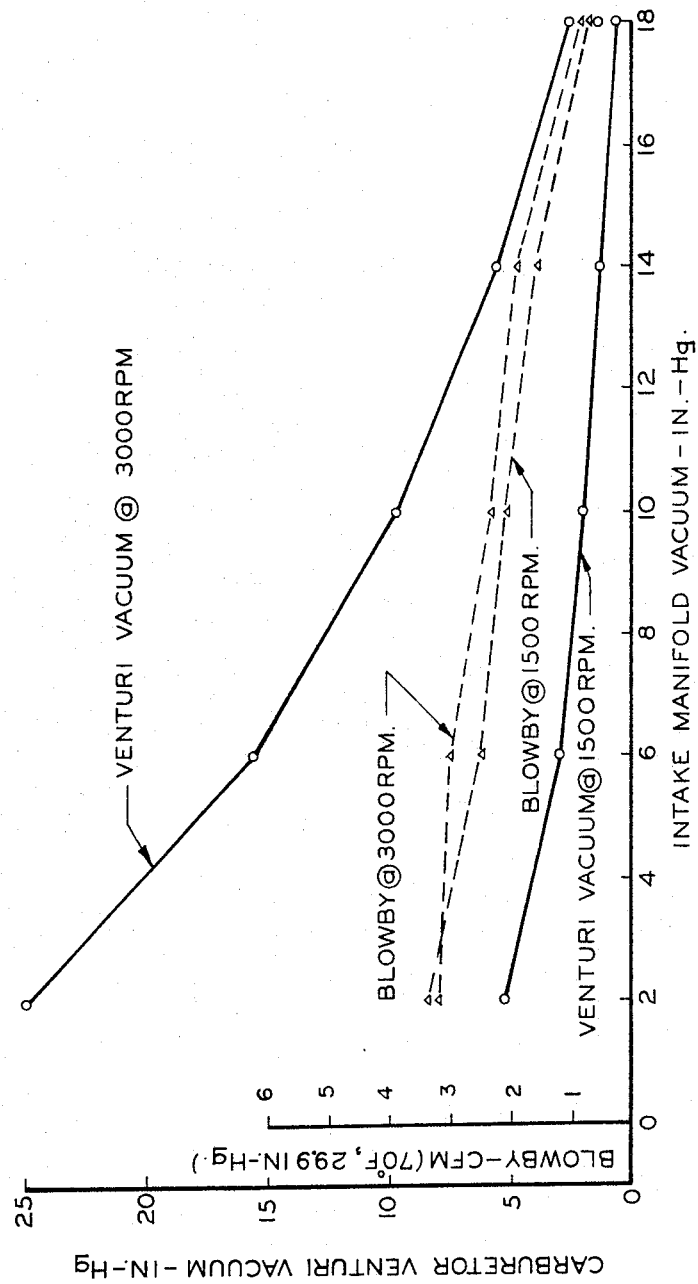

FIG. 5
VENTURI VACUUM AT WOT
WITH AND WITHOUT IMPACT TUBES
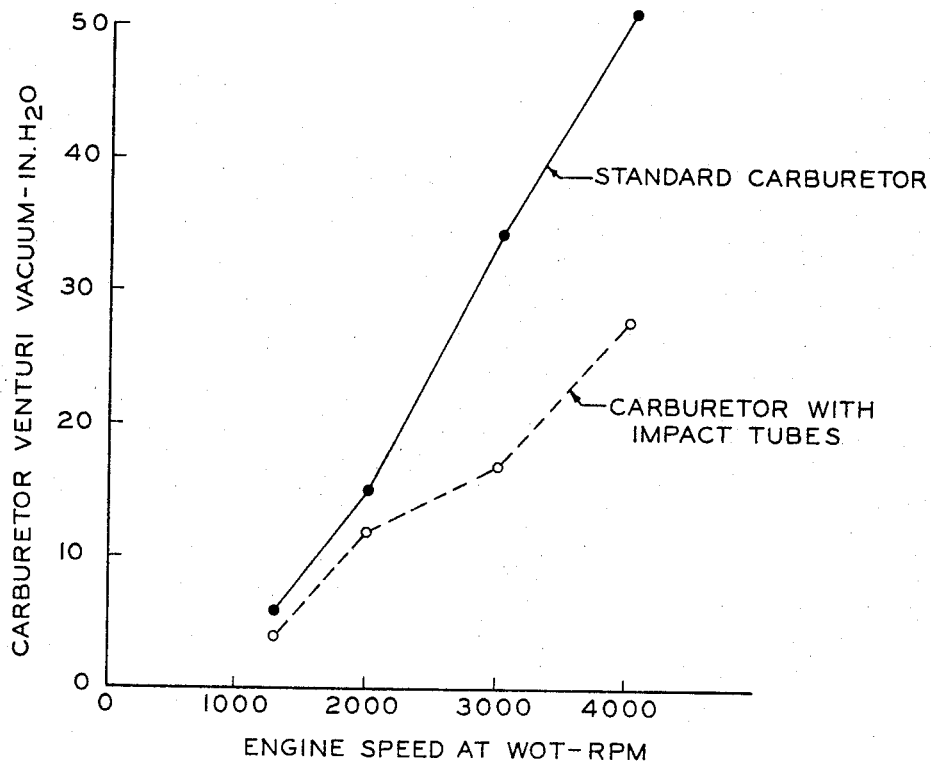
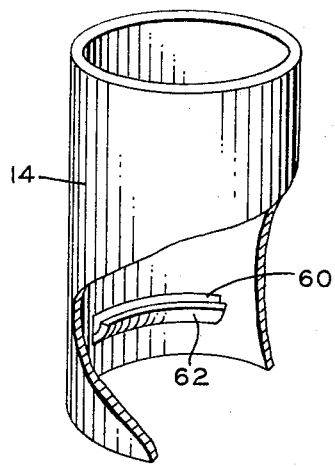
FIG. 6
ARTHUR M. SMITH
PHILIP V. MOSHER
*INVENTORS*
BY *John R. Faulkner*
*Robert E. McCollum*
ATTORNEYS

United States Patent Office 3,280,808
Patented Oct. 25, 1966

3,280,808
ENGINE CRANKCASE VENTILATING SYSTEM
Philip V. Mosher, Detroit, and Arthur M. Smith, Plymouth, Mich., assignors to Ford Motor Company, Dearborn, Mich., a corporation of Delaware
Filed Jan. 4, 1965, Ser. No. 423,174
14 Claims. (Cl. 123—119)

This invention relates to an internal combustion engine. More particularly, it relates to an engine having crankcase ventilating means to reduce the injection of smog producing elements into the atmosphere.

Many methods, schemes and devices have been thought of for reducing smog. One of these proposes a crankcase emission system whereby engine blowby and other undesirable crankcase emission elements are inducted by engine intake manifold vacuum into the combustion chamber so that they will be burned with the air-fuel mixture. This type of system, however, has a disadvantage. Engine intake manifold vacuum decreases with increases in engine load. Engine blowby, on the other hand, increases with engine load. At higher load levels, therefore, engine intake manifold vacuum is inadequate to purge the crankcase of engine blowby and crankcase emission gases.

The invention utilizes carburetor venturi vacuum to remove blowby and crankcase emission gases into the engine induction system. Both venturi vacuum and engine blowby rate increase with increasing engine load. Blowby is relatively unaffected or increases very little with increases in engine speed. Venturi vacuum, on the other hand, increases rapidly so that at higher engine speeds it is more than adequate to remove engine blowby and crankcase emission elements. At low engine speeds and loads, however, such as at engine idle, the low air flow causes venturi vacuum to be inadequate.

To compensate for this low venturi vacuum, the invention provides a shrouded and restricted breather cap for the crankcase ventilating system that pressurizes the crankcase to a level above that of the pressure in the carburetor venturi section. The shroud on the breather cap provides a ram air inlet, while the restriction in the cap controls the pressurization of the crankcase so that it will not be excessive. It will be evident, therefore, that with ram air pressurization, venturi vacuum will be adequate at all engine speeds to remove blowby.

At high engine speeds, venturi vacuum can be considerably higher than is necessary to remove engine blowby. Too great a pressure differential between the crankcase and the venturi section could result in a flow of some of the oil vapors into the venturi section, resulting in excessive oil consumption, and also, possible undesirable changes in the air-fuel ratio.

The invention also provides an impact tube or impactor cup projecting into the venturi section for controlling the flow of blowby and crankcase emission gases at higher engine speeds by reducing the venturi vacuum acting in the tube on the blowby and gases. The impact tube has an opening that points substantially into the carburetor flow stream so that the air-fuel mixture impacts against the end of the tube and thereby decreases the venturi vacuum in the tube. This results in reducing induction of the blowby into the carburetor. The angle at which the outlet in the tube is positioned is chosen such that the pressure differential between the crankcase and venturi is controlled to insure the desired flow of blowby and crankcase emission gases at all engine speeds.

At low engine speeds and loads, the ram pressure effect of the air flow on the tube is small, and venturi vacuum completely evacuates the blowby. At high engine speeds and loads, the impact tube or cup reduces the venturi vacuum inside the tube or cup to a level where it is not excessive and, therefore, does not cause an excessive flow from the crankcase into the intake manifold system.

It is, therefore, a primary object of the invention to provide an internal combustion engine with a crankcase emission system that utilizes carburetor venturi vacuum to remove engine blowby and crankcase emission gases into the engine induction system.

A further object of the invention is to provide a smog control device of the type described above, in which an impact tube or impactor cup projects into the carburetor venturi above the throttle valve, whereby the air flowing through the carburetor strikes the end of the tube or cup with a ram pressure that decreases venturi vacuum inside the tube so that excessive induction of engine blowby and crankcase emission gases through the tube or cup into the engine induction system is prevented. The tube or cup is suitably shaped and located to provide a substantially progressive decrease in the rate venturi vacuum increases inside the tube with progressive increases in engine speed and load. That is, the rate of change of flow through the tube or cup varies inversely as a function of the change in engine speed and load.

Another object of the invention is to provide an engine of the type described above with a crankcase ventilating system having a shrouded and restricted breather cap for providing a ram air flow system to pressurize the space above the crankcase to a pressure level sufficiently higher than the pressure in the carburetor venturi section so that engine blowby and crankcase emission gases will flow into the carburetor at all engine speeds.

A still further object of the invention is to provide a smog control device for an internal combustion engine that is simple in construction, efficient in operation, and provides substantially no disturbance to the operating conditions of the engine.

Other objects, features and advantages of the invention will become apparent upon reference to the succeeding, detailed description thereof, and to the drawings illustrating the preferred embodiments thereof; wherein, FIGURE 1 is a side-elevational view, with parts broken away, of an internal combustion engine embodying the invention;

FIGURE 2 is a cross-sectional view of a detail of FIGURE 1;

FIGURE 3 is an enlarged cross-sectional view of another detail of FIGURE 1;

FIGURE 4 is a plot of the relationship between the changes in carburetor venturi vacuum and engine blowby with changes in intake manifold vacuum at exemplary selected speeds of the engine;

FIGURE 5 is a plot of changes in carburetor venturi vacuum with changes in engine speed at full load, for a conventional carburetor, and one constructed according to the invention; and, FIGURE 6 is a perspective view of a modification of the FIGURE 3 construction.

FIGURE 1 shows a typical internal combustion engine 1 of the six-cylinder, in-line type. It has an air cleaner 10 fitted over the inlet 12 to a downdraft-type carburetor 14. The carburetor discharges an air-fuel mixture into an engine intake manifold 16 connected to each of the engine combustion chambers (not shown). An exhaust manifold 18 has connections to the engine exhaust ports in the normal manner, and to a collector 20 that is connected to the engine exhaust piping, not shown, in a known manner.

Engine 1 has a conventional crankcase 22 containing oil or other suitable lubricant to a level sufficient for lubricating purposes. The crankcase has a ventilating system consisting of a tube 23 (shown partially in FIGURE 2) connected at one end to the atmosphere through one of the engine rocker arm and valve covers 24, and at its opposite end to a location just above the oil level in crankcase 22. The open end of the tube is covered by a breather cap 26.

As best seen in FIGURES 1 and 2, breather cap 26 is provided at its inner or lower portion with a partial shroud 28 sufficiently shaped to provide a ram air inlet to tube 23. FIGURE 2 shows cap 26 divided centrally by an apertured plate 30 closely surrounding tube 23 and having a number of holes 32 for admitting ram air into the upper section 34 of the cap. The upper section is filled with porous air cleaning material 36 of a suitable nature. The upper end of tube 23 is provided with an orifice 38 to control the flow of ventilating air into the region directly above the oil in the crankcase.

From the above description, it will be clear that during all operations of the engine, the conventional engine fan (not shown) will force or ram air into the lower shrouded portion of breather cap 26 and through orifice 38 into the region above the oil in crankcase 22. This pressurizes the crankcase sufficiently so that even at low engine speeds, when venturi vacuum is also normally low, the ambient pressure in the region above the oil in the crankcase will be at a level sufficiently higher than the pressure in the carburetor to induce flow of all the engine blowby and crankcase emission gases into the engine induction system in a manner to be described later.

FIGURE 1 shows, by arrows 40, the path of the ventilating air. It enters the breather cap 26 and passes through orifice 38 into the crankcase space where it combines with the engine blowby. Because of the pressurization of the crankcase emission gases, they are directed upwardly toward an outlet in the other engine rocker arm cover 24. At this point, they enter a hose 42 of a relatively unrestricted size that is connected at its opposite end, as best seen in FIGURE 3, to an enlarged chamber 44 formed in the side wall of carburetor 14. This chamber has an opening 46 into the carburetor flow passage.

Carburetor 14 is of a known type having a choke valve 48, primary and secondary venturis 50 and 52, and a throttle or butterfly valve 54. The choke is located beneath air inlet 12 under air cleaner 10 shown in FIGURE 1. The throttle valve 54 is located in the normal manner in the entrance to the engine intake manifold 16.

The opening 46 connecting chamber 44 with the carburetor, is specifically located near the throat or venturi sections 50 and 52, and above the conventional butterfly throttle valve. As stated previously, this is done so that the crankcase will be subject to venturi vacuum rather than intake manifold vacuum.

FIGURE 3 shows opening 46 as containing a short impact tube 56 that projects out into the flow passage adjacent venturi sections 50 and 52. The small diameter of this tube provides the only restriction for the flow of blowby from the crankcase into the engine induction system. The tube 56 is open at opposite ends, the end 58 projecting into the venturi sections being canted or pointed at an angle of approximately 45°, for example, in the direction facing the flow of air fuel mixture through the carburetor. This is done so that the air flow will impact or impinge against the open end 58 of the impact tube to create a pressure head against it that opposes the venturi vacuum inside the tube and thereby retards the flow of blowby into the engine induction system as a function of the increase in air speed through the carburetor.

Since air flow through the carburetor is low at low engine speeds and loads, the ram effect of this air flow on the end of the impact tube 56 is not great at these speed and load levels. The increase in ram pressure at higher engine speeds and loads, however, is sufficient to reduce the venturi vacuum inside the tube to prevent the induction of too great a flow of blowby from the crankcase into the induction system.

FIGURE 4 shows the relationship in a conventional 260 C.I.D. engine between changes in venturi vacuum and blowby with changes in engine intake manifold vacuum, at two exemplary speeds of the engine. For example, at an engine speed of 1500 r.p.m., venturi vacuum is less than engine blowby, even though venturi vacuum increases with a decrease in engine intake manifold vacuum. With the construction according to the invention, the ram air inlet in the breather cap provides a sufficient increase to the pressure above the crankcase oil to positively provide a flow of blowby and crankcase emission gases into the engine induction system at these speeds, even though venturi vacuum is low.

FIGURE 4 also shows that at an engine speed of 3000 r.p.m., for example, the engine blowby has increased relatively little as compared to the large increase in venturi vacuum with decreases in engine intake manifold vacuum. It is at this point that the impact tube provides the necessary reduction in crankcase vacuum so that an excessive flow through the tube is prevented at this speed and load level.

FIGURE 4 also shows that blowby increases at all engine speeds with a decrease in engine intake manifold vacuum; and that, therefore, at higher engine loads, the engine intake manifold vacuum is not adequate to remove engine blowby and crankcase emission gases.

FIGURE 5 shows the relationship between changes in venturi vacuum in carburetors with and without impact tubes at wide open throttle conditions.

The invention will become clearer upon a consideration of the over-all operation of the invention. At low engine operating conditions, such as during engine idle, throttle valve 54 is substantially closed and venturi vacuum is low. The volume of blowby and crankcase emission gases at this point is higher than the amount venturi vacuum normally can remove. The ram air provided by the engine fan, however, sufficiently pressurizes the gases and blowby above the crankcase oil so that sufficient flow occurs through the engine in the direction of the arrows 40 into hose 42, into chamber 44 and out into the carburetor venturi sections 50 and 52 through the restricted impact tube 56. These gases are then inducted into the engine intake manifold and burned with the air-fuel mixture in the combustion chambers. Upon opening engine throttle valve 54, venturi vacuum normally increases with a corresponding decrease in engine intake manifold vacuum, as shown in FIGURE 4. This increase in venturi vacuum increases the flow of blowby and crankcase emission gases into the engine induction system. As the engine speeds up, the air flow through the carburetor increases, increasing the ram pressure against the end of the impact tube. This decreases venturi vacuum inside the tube so that while the flow of blowby continues to increase, the rate at which it increases is being reduced due to the increasing ram effect. This continues with changes in speed until the point is reached where the ram pressure decreases the venturi vacuum rate to a point where it induces only enough flow through tube 56 to remove all of the engine blowby and crankcase emission gases into the induction system and yet not provide enough additional flow to significantly disturb the normal operating conditions of the engine. That is, the flow will be sufficient to remove the undesirable gases, but will not be sufficient to provide undesirable oil consumption or substantially interfere with the proper air-fuel mixture ratio.

FIGURE 6 shows a modification of the impact tube or nozzle shown in FIGURE 3. In FIGURE 6, the carburetor wall is slotted and a portion of the wall bent inwardly to provide an arcuate opening 60 and a tab or plate 62 projecting at an angle into the carburetor air stream. The air flowing through the venturi section towards the throttle valve will impinge against plate 62 in substantially the same manner as against the end of tube 56 in FIGURE 3 to reduce the rate of venturi vacuum increase inside the tube in inverse proportion to changes in engine speed and loads. That is, the carburetor air flow impinging against the angled tab or plate 62 retards the rate of flow of crankcase emission gases and blowby in the same manner as the impact tube in FIGURE 3, thereby providing a progressive decrease in the flow rate of these gases with increases in air flow and engine speeds.

The construction shown in FIGURE 6 is preferred to that shown in FIGURE 3, since by its construction, it would have less disturbing effect on the fuel-air ratio, and, therefore, the operating conditions of the engine.

From the foregoing, it will be seen that the invention provides an engine with a smog control system that operates effectively at all engine speeds and loads to remove engine blowby and crankcase emission gases into the engine combustion chambers to prevent exhaust of these gases and blowby out into the atmosphere. It will also be seen that the smog control system works efficiently at all speed and load levels, and is relatively simple in construction so that it can be added to substantially all existing carburetors with only a few minor changes.

While the invention has been illustrated in its preferred embodiments in the figures, it will be clear to those skilled in the art to which the invention pertains that many changes and modifications may be made thereto without departing from the scope of the invention.

What is claimed is:

1. An internal combustion engine having a carburetor having fluid inlet and outlet means and a throttle valve for controlling flow therebetween, a crankcase, and means for removing crankcase emission gases to said carburetor, said latter means comprising fluid conducting means connected at one end to said crankcase and having its other end projecting into said carburetor adjacent a venturi section therein, the normal fluid flow through said venturi inducing flow of crankcase emission fluids through said conducting means into said carburetor, and means for creating a pressure force on said gases during low rate of flow of fluid through said venturi sufficient to flow said crankcase emission fluids through said conducting means into said carburetor.

2. An internal combustion engine having a carburetor having fluid inlet and outlet means and a throttle valve for controlling flow therebetween, a crankcase, and means for removing crankcase emission gases to said carburetor, said latter means comprising engine blowby conducting means connected at one end to said crankcase and having its other projecting into said carburetor adjacent a venturi section therein, the normal air-fuel mixture flow through said venturi inducing flow of blowby from said crankcase through said conducting means into said carburetor, and means for creating a pressure force on said gases during low rate of flow of fluid through said venturi sufficient to flow said crankcase emission fluids through said conducting means into said carburetor.

3. An internal combustion engine having a carburetor, a crankcase, and means for removing crankcase emission gases to said carburetor, said latter means comprising fluid conducting means connected at one end to said crankcase and having its other end projecting into said carburetor adjacent a venturi section therein, the normal fluid flow through said venturi inducing flow of crankcase emission fluids through said conducting means into said carburetor, said projecting end of said conducting means having an opening receiving the flow of carburetor fluid thereagainst whereby the flow rate of crankcase emission fluids into said carburetor is progressively decreased as a function of the increase in flow of carburetor fluid.

4. An internal combustion engine having a carburetor, a crankcase, and means for removing crankcase emission gases to said carburetor, said latter means comprising fluid conducting means connected at one end to said crankcase and having its other end projecting into said carburetor adjacent a venturi section therein, the normal fluid flow through said venturi inducing flow of crankcase emission fluids through said conducting means into said carburetor, said projecting end of said conducting means being so disposed as to deflect a portion of the carburetor fluid flow in a direction to retard the flow of crankcase emission fluids whereby the flow rate of crankcase emission fluids into said carburetor is progressively changed as an inverse function of the change in flow of carburetor fluid and engine speed.

5. An internal combustion engine having a carburetor, a crankcase, and means for removing crankcase emission gases to said carburetor, said latter means comprising fluid conducting means connected at one end to said crankcase and at its other end to said carburetor, a nozzle connected to said conducting means and projecting into the carburetor air stream adjacent a venturi section therein, the flow of carburetor fluid through said carburetor inducing flow of said crankcase emission fluids through said conducting means and nozzle into said carburetor, said nozzle having an opening directed against the flow of carburetor fluid whereby the flow rate of crankcase emission fluids into said carburetor is progressively decreased as a function of the increase in flow of carburetor fluid.

6. An internal combustion engine having a carburetor, a crankcase, and means for removing crankcase emission gases to said carburetor, said latter means comprising fluid conducting means connected at one end to said crankcase and at its other end to said carburetor, a nozzle connected to said conducting means and projecting into the carburetor air stream adjacent a venturi section therein, the flow of carburetor fluid through said carburetor inducing flow of said crankcase emission fluids through said conducting means and nozzle into said carburetor, said nozzle having an opening substantially facing the flow of carburetor fluid whereby the flow rate of crankcase emission fluids into said carburetor is progressively decreased as a function of the increase in flow of carburetor fluid.

7. An internal combustion engine having a carburetor, a crankcase, and means for removing crankcase emission gases to said carburetor, said latter means comprising fluid conducting means connected at one end to said crankcase and at its other end to said carburetor, a nozzle connected to said conducting means and projecting into the carburetor air stream adjacent a venturi section therein, the flow of carburetor fluid through said carburetor inducing flow of said crankcase emission fluids through said conducting means and nozzle into said carburetor, said nozzle having an opening substantially facing the flow of carburetor fluid so that the carburetor fluid flow impacts against said opening and retards the flow of crankcase emission gases therefrom whereby the flow rate of crankcase emission fluids into said carburetor is progressively decreased as a function of the increase in flow of carburetor fluid.

8. An internal combustion engine having a carburetor, a crankcase, crankcase ventilating means communicating at one end with the atmosphere and at its opposite end with said crankcase, and means for removing crankcase emission gases to said carburetor, said latter means comprising fluid conducting means connected at one end to said crankcase and at its other end to said carburetor, a control means connected to said conducting means and projecting into said carburetor adjacent a venturi section therein, the air flow through said carburetor inducing flow of said crankcase emission fluids through said conducting means and control means into said carburetor air stream, said ventilating means having ram air inlet directing means for pressurizing said crankcase at all engine speeds to a level higher than the pressure level of the air flow through said carburetor, said control means having an opening canted in a direction to impinge the air stream thereagainst whereby the flow rate of crankcase emission fluids into said carburetor is progressively decreased as a function of the increase in the air flow through said carburetor upon increase in engine speeds.

9. An internal combustion engine having a carburetor, a crankcase, crankcase ventilating means communicating at one end with the atmosphere and at its opposite end with said crankcase, and means for removing crankcase emission gases to said carburetor, said latter means comprising fluid conducting means connected at one end to said crankcase and at its other end to said carburetor, a nozzle connected to said conducting means and projecting into said carburetor between a venturi section therein and a carburetor throttle valve, the air-fuel mixture flow through said carburetor inducing flow of said crankcase emission fluids through said conducting means and nozzle into said carburetor air stream, said ventilating means having ram air inlet directing means for pressurizing said crankcase at all engine speeds to a level higher than the pressure in said nozzle, said nozzle having an opening canted in a direction to impinge the air stream thereagainst whereby the flow rate of crankcase emission fluids into said carburetor is progressively decreased as a function of the increase in the air flow through said carburetor upon increase in engine speeds.

10. An internal combustion engine having a carburetor, a crankcase, air breathing means having an inlet communicating with the atmosphere and an outlet communicating with said crankcase, and means for removing crankcase emission gases to said carburetor, said latter means comprising fluid conduit means operably connected at one end to said crankcase and at its other end to said carburetor, a fluid impact tube connected to said conduit means and projecting into the air-fuel mixture stream in said carburetor between a venturi section and a throttle valve therein, the venturi vacuum acting on said tube inducing flow of said crankcase emission fluids through said conducting means and tube into the carburetor air stream, said breathing means having ram air inlet shroud means pressurizing said breathing means and said crankcase at all engine speeds to a level higher than the pressure in said impact tube to induce flow of said gases into said carburetor, said impact tube having an opening constructed and arranged to be impacted by the flow of air-fuel mixture through said carburetor to retard the flow of gases through said tube whereby the flow rate of crankcase emission gases into said carburetor is progressively decreased as a function of the increase in engine speed and the air flow through said carburetor.

11. An internal combustion engine having a carburetor, a crankcase, air breathing means having an inlet communicating with the atmosphere and an outlet communicating with said crankcase, and means for removing crankcase emission gases to said carburetor, said latter means comprising fluid conducting means connected at one end to said crankcase and at its other end to an opening in said carburetor between a venturi and a throttle valve therein, the venturi vacuum inducing flow of said crankcase emission fluids through said conducting means into said carburetor air stream, and breathing means having ram air inlet directing means for pressurizing said breathing means and said crankcase at all engine speeds to a level higher than the pressure in said conducting means, said carburetor having an air flow impinging plate projecting into the carburetor air stream below said opening whereby the air flow impacts thereagainst and against the crankcase emission gases therein to retard the flow of said gases into said carburetor, the rate of change of flow of crankcase emission gases into said carburetor progressively changing as an inverse function of the change in the engine speed and air flow through said carburetor.

12. An internal combustion engine having a carburetor, a crankcase, and means for removing crankcase emission gases to said carburetor, said latter means comprising fluid conducting means connected at one end to said crankcase and at its other end to an opening in said carburetor between a venturi and a throttle valve therein, the venturi vacuum inducing flow of said crankcase emission fluids through said conducting means into the carburetor air stream, said carburetor having an air flow impinging plate projecting into the carburetor air stream below said opening whereby the air flow impacts thereagainst and against the crankcase emission gases therein to retard the flow of said gases into said carburetor, the rate of change of flow of crankcase emission gases into said carburetor progressively changing as an inverse function of the change in the engine speed and air flow through said carburetor.

13. An engine as in claim 12, wherein said carburetor includes a wall portion having a perforated portion therein, said perforated portion of said wall being bent at an angle to said wall to provide said opening in said carburetor, said bent portion projecting into said carburetor air stream to form said impinging plate.

14. An engine as in claim 13, said bent wall portion extending in a direction against the normal direction of flow of air through said carburetor.

References Cited by the Examiner

UNITED STATES PATENTS

| | | | |
|---|---|---|---|
| 2,281,124 | 4/1942 | Westcott | 123—119 |
| 2,737,935 | 3/1956 | Olson | 123—119 |
| 3,030,942 | 4/1962 | Thompson | 123—119 |
| 3,116,727 | 1/1964 | Dietrich | 123—119 |
| 3,161,187 | 12/1964 | Parker | 123—119 |
| 3,170,448 | 2/1965 | Campbell | 123—119 |
| 3,175,546 | 3/1965 | Roper | 123—119 |

MARK NEWMAN, *Primary Examiner.*

AL LAWRENCE SMITH, *Examiner.*